Sept. 17, 1968  G. J. WENDELKEN  3,401,926
CARRIAGE CONTROL MEANS FOR CLOTH LAYING MACHINES
Filed May 9, 1966  3 Sheets-Sheet 1
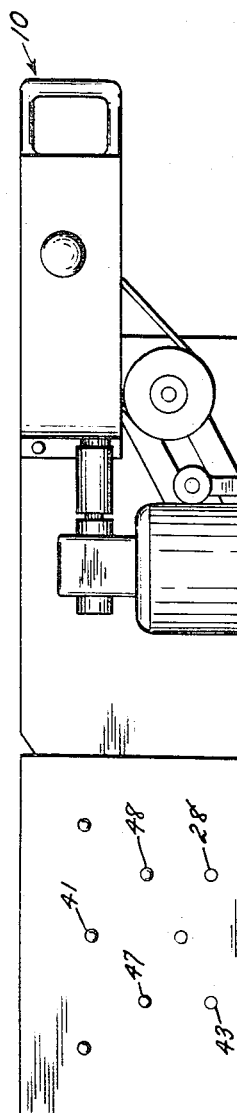
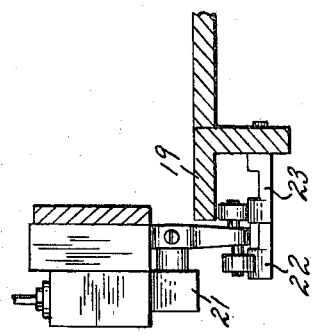
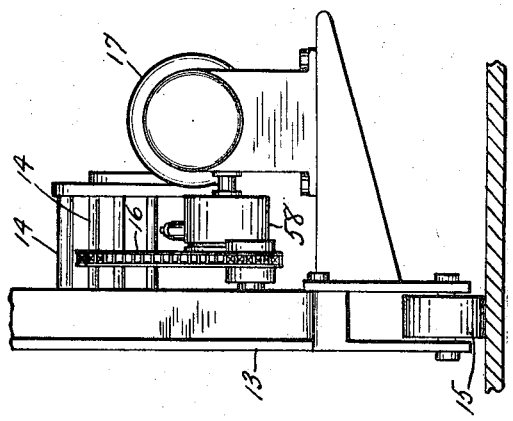

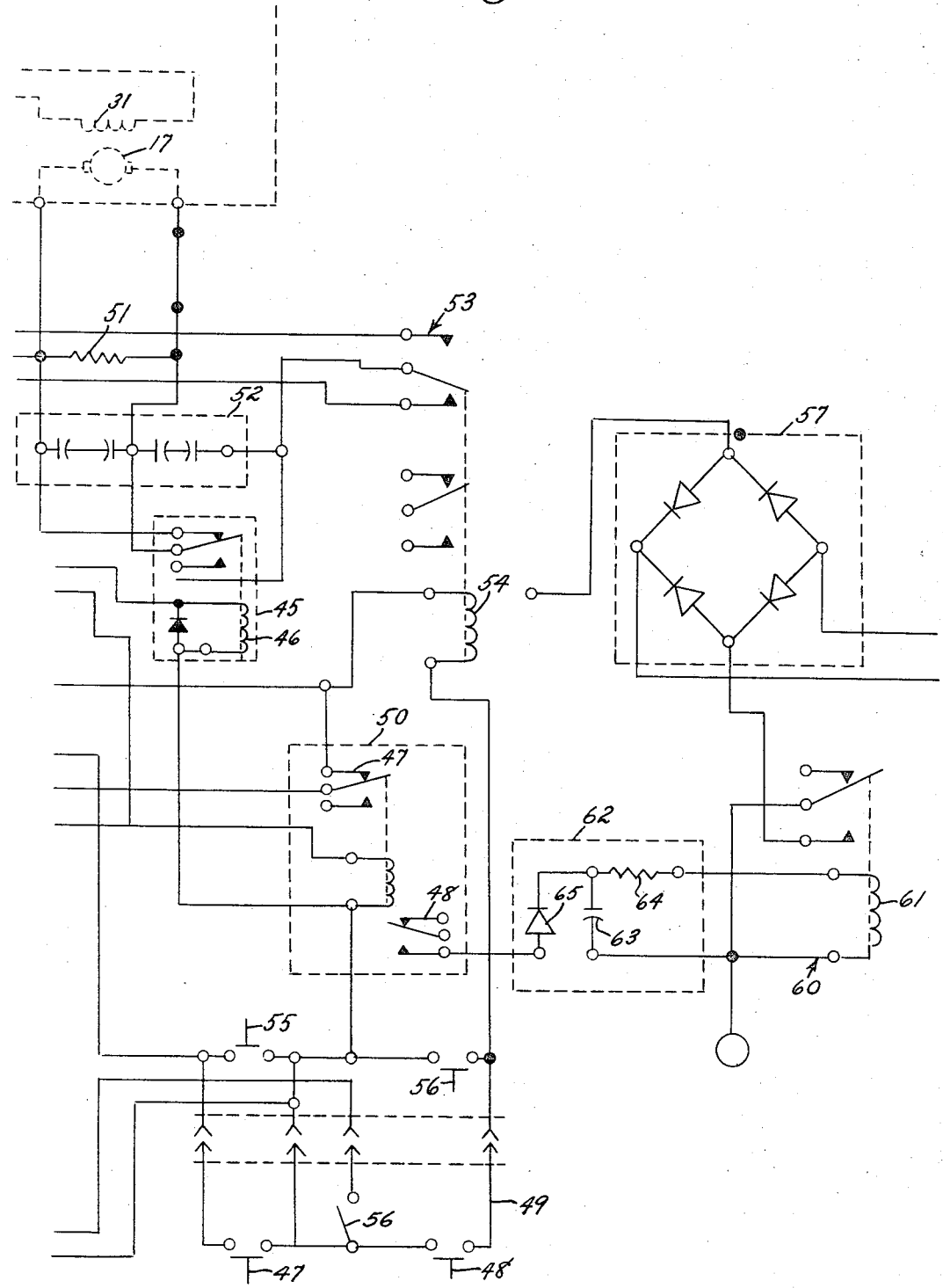

United States Patent Office 3,401,926
Patented Sept. 17, 1968

3,401,926
CARRIAGE CONTROL MEANS FOR CLOTH
LAYING MACHINES
Gerard J. Wendelken, Harrington Park, N.Y., assignor to
Cutting Room Appliances Corp., New York, N.Y.
Filed May 9, 1966, Ser. No. 548,553
1 Claim. (Cl. 270—31)

ABSTRACT OF THE DISCLOSURE

A motor driven carriage for a cloth laying machine, including clutch means interconnecting the motor and the driven mechanism, and means for disengaging the clutch means in serial relation to the interruption of current flow to the motor, whereby the clutch means will remain engaged until the carriage has come to a stop, and the automatic disengagement of the clutch means permits manual positioning of the carriage before resumption of current flow to the motor.

---

This invention relates generally to the field of cloth laying machines of the type disclosed in U.S. Patent No. 3,094,319, granted June 18, 1963 to Walter Deichmann, and assigned to the same assignee as the present application; and more particularly to an improved means for controlling movement of the carriage element which reciprocates over a cloth laying table in such manner as to permit increased speed of operation and increased facility in manipulating the carriage element at the end of a reciprocating cycle.

It is among the principal objects of the present invention to provide in a device of the class described an improved motor control means which will facilitate smooth acceleration and deceleration along a predetermined path of travel of the carriage element.

Another object of the invention lies in the provision of improved means for controlling movement of the carriage element, under power, in such manner that controls therefor cannot be erroneously operated by a user.

Yet another object of the invention lies in the provision of improved control means for regulating the movement of the carriage element over a cloth laying table which may be incorporated into existing cloth laying carriages with a minimum of modification.

These objects, as well as other incidental ends and advantages, will more fully appear during the progress of the following disclosure, and be pointed out in the appended claim.

In the drawing, to which reference will be made in the specification, similar reference characters have been employed to designate corresponding parts throughout the several views.

FIGURE 1 is a fragmentary end elevational view of a cloth laying machine carriage.

FIGURE 2 is a fragmentary view in elevation as might be seen from the right hand portion of FIGURE 1.

FIGURE 3 is a fragmentary end elevational view of a cloth laying machine carriage, showing the end opposite that seen in FIGURE 1.

Figure 4A:
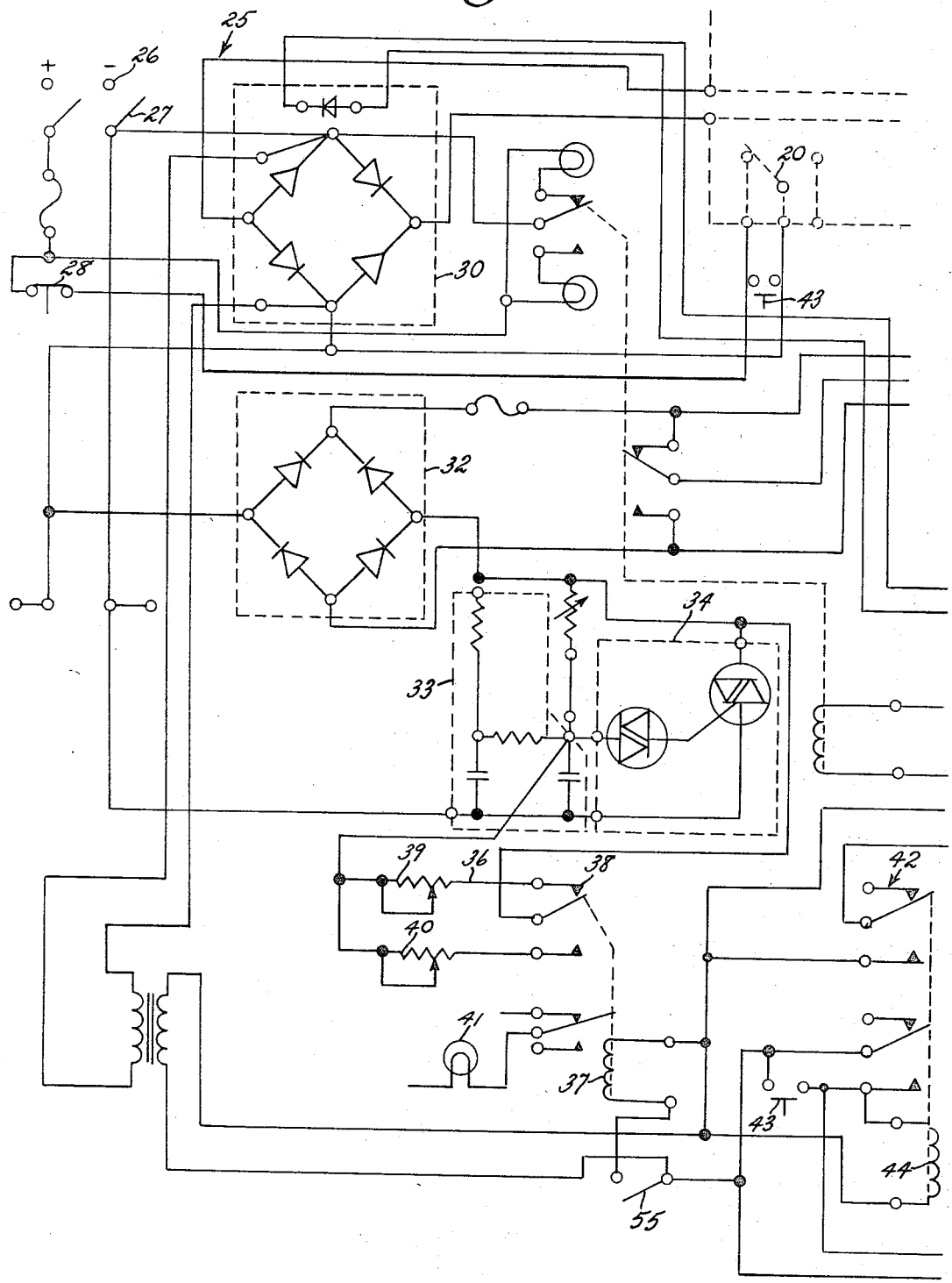

FIGURES 4a and 4b comprise a schematic electrical wiring diagram of the control means comprising the disclosed embodiment.

Before entering into a detailed consideration of the present invention, a description of the operation of the prior art devices will facilitate an understanding of the same.

In devices of the type disclosed in the above-mentioned Patent No. 3,094,319, the reciprocating carriage is provided with a turntable mounted thereupon, the turntable, in turn, supporting a roll of cloth, a continuous web of which is laid upon the cloth laying table as the carriage moves thereover. Where during the cloth laying operation it is important to have each lamina of cloth facing in the same direction, it is not possible to lay the cloth in a series of S folds, but rather as the carriage comes to a stop at the end of the table, it is necessary to cut the cloth, rotate the turntable through 180 degrees, and align the cut edges of the web before commencing movement of the carriage in an opposite direction, so that each lamina will be of the same length to facilitate the subsequent cutting of the cloth with a minimum of waste. While the cutting of the web of cloth is conveniently accomplished by means known in the art and incorporated as a part of the carriage, the alignment of the cut edges, after rotation of the turntable is essentially a manual operation, and requires manual movement of the carriage for short distances after the remaining web has been rethreaded. To permit such manual movement, the carriage is usually provided with manually operated clutch means whereby the electrically powered driving means may be disconnected to permit the carriage to roll freely upon supporting wheels. To save time, the aligned edges are not usually disposed beneath a catcher, as is the case where the cloth is laid in S folds, and in order not to disturb the alignment, the carriage must proceed at a relatively slow rate, at least until a substantial portion of the rethreaded web has been positioned upon the lamina immediately therebeneath. Prior art designs permit so-called "tensionless feeding" of the web, and as long as the carriage is smoothly started at a relatively low velocity, the alignment of the cut edges is not disturbed. However, moving the carriage at relatively low speed requires a substantial period of time for the carriage to traverse the entire length of the table, and accordingly, the speed of deposition of the cloth on the table is correspondingly low.

In the embodiment disclosed herein, it is proposed to drive the carriage, under power, as is known in the prior art, but to commence movement of the carriage in a given direction at a relatively low speed, this speed being maintained for a relatively short distance in order not to disturb the alignment of the cut edges of the web, and after a sufficient amount of cloth has been so deposited, the carriage is accelerated to a much higher velocity for the traverse of a substantial part of the remaining path of travel. When approaching the opposite end of the table, the carriage is automatically slowed to the original starting velocity, and a relatively short distance before the carriage comes to a complete stop, power to the driving motor is interrupted, and the motor is caused to serve as a dynamic brake to bring the carriage to a stop, substantially in the same place each time. As soon as the carriage has come to a stop, the clutch, previously manually disconnected by the user is automatically released, whereby the operator may move the carriage short distances after rotation of the turntable and rethreading of the remaining web to realign the next set of cut edges. After such alignment, the closing of a single switch serves to reengage the clutch for power transmission to the driving wheels of the carriage, and start the carriage at relatively low velocity in a previously selected opposite direction for a repetition of the cycle. Since the clutch is automatically disengaged as quickly as possible, and a large portion of the path of travel is traversed at relatively high speed, the clutch being automatically reengaged upon commencement of subsequent movement, the elapsed time for each reciprocation of the carriage over the table is materially reduced.

With the foregoing discussion in mind, reference may be now made to FIGURE 1 of the drawing, wherein the device, generally indicated by reference character 10, comprises a cloth laying carriage 11 of the type disclosed in the above mentioned U.S. Patent No. 3,094,319. The carriage 11 includes vertically disposed end frames 12 and 13 interconnected by transversely extending members 14. The carriage is supported by wheels 15 driven through sprocket chains 16 by a motor 17 having integral gear reduction means, whereby the carriage 11 traverses in cyclic fashion over the surface of a cloth laying table 18. To assure rectilinear movement, the wheels on one end frame 12 are guided by track means 19. Projecting downwardly from the lower portion of the end frame 12 are first and second switches 20 and 21, each provided with roller actuators positioned to selectively contact correspondingly aligned trippers 22 and 23. As will more fully appear, the switch 20 is actuated by one tripper 22 at the end of a path of travel, for the purposes of stopping the carriage, while the switch 20 is actuated by one of the trippers 23 positioned a short distance in a medial direction from a tripper 22 for the purpose of changing the speed of the carriage immediately following contact of the switch with the tripper.

Referring to FIGURES 4a and 4b, there is illustrated a control means, generally indicated by reference character 25, for governing the movement of the carriage in accordance with a prearranged cycle. The control means 25 is connected to a power source 26, which will normally be 110 volt, single phase, alternating current by a main switch 27. To provide for interruption of current for purposes of stopping the motor 17 when the carriage is located at points between the limits of its path of travel, an emergency stop switch 28 is provided, the actuating button of which is shown in FIGURE 1. To facilitate servicing of the control means, the major components are preferably formed as plug-in modules.

A field rectifier module is indicated by reference character 30, the same powering the field winding 31 of the motor 17 (FIGURE 4b).

The power converter module 32 which includes a rectifier operates in conjunction with a power shift module 33 and power control module 34 to supply current to the armature 35 of the motor 17. The modules 32 and 33 are conventional and known in the art. The power control module 34 includes a diac providing bidirectional pulses to control a triac, which in turn provides variable alternating current rectified in the proper direction to power the armature of the motor 17.

A speed change module 36 is controlled by the switch 21, and includes a relay 37 which assumes an alternate position on each actuation. The relay 37 operates a single pole, double throw switch 38 which selectively interconnects first and second variable resistances 39 and 40, respectively which are manually adjusted to provide proper operating voltages during the periods in which the motor is operating at low and high speeds. During the period in which the switch 38 is in the position shown in FIGURE 4a, a speed indicator light 41 is illuminated to show that the carriage is moving at accelerated velocity.

The stop control module 42 includes a start buttom 43, the manual actuator of which is shown in FIGURE 1, which actuates a self-latching relay 44 which is unlatched by operation of the switch 20.

A directional interlock module 45 is operated by a relay 46, the position of the relay being governed by directional switches 47 and 48 mounted in a module 49, and serves to assure that should the motor 17 be stopped during the middle of a cycle, it will commence rotation in the same direction.

The dynamic braking module 50 is powered by the field rectifier module 30, so that it may operate after current to the motor has been interrupted, and serves to place resistance 51 in series with the motor so that the inertial of the carriage may be dissipated rapidly, and the carriage brought to a stop.

The arc suppressor module 52 is of well known type, and similar to that disclosed in my U.S. Patent No. 3,222,005, granted Dec. 7, 1965, and assigned to the same assignee as the present application.

The motor direction module 53 is controlled by a latching relay 54, which moves in either of two directions under the control of left and right switches 55 and 56.

A clutch rectifier module 57 supplies direct current to a clutch 58 which interconnects the output of the motor 17 to the sprocket chain 16 wherein motion is transmitted to the wheels 15 (see FIGURE 2). A clutch control module 60 includes a relay 61 in turn controlled by a time delay module 62 including a capacitor 63 and resistor 64. During the period in which the motor 17 is in operation, current charges the capacitor 63 through a diode 65, and upon the interruption of current, the capacitor discharges through a resistor 64, so that the relay 61 remains actuated for a period of approximately two seconds after interruption of the current to the motor, the time normally required to bring the carriage to a stop under the influence of the dynamically braked motor.

During operation, at the commencement of each cycle of reciprocation, the operator selects the direction of carriage travel by closing one of the switches 55 and 56, the actuators of which are mounted on the control panel 70 (FIGURE 1). Pressing the start button 43, the carriage will move in the selected direction at relatively slow speed until contact is made between the switch 21 and the nearest tripper 23 (FIGURES 1 and 3). With the operation of the relay 37, resistance 40 is substituted for resistance 39, illuminating the light 41, and immediately accelerating the motor 17 to the higher speed for continuing traverse to a point where the switch 21 contacts the other of the trippers 23, following which the resistance 39 is again substituted for the resistance 40 to result in deceleration of the motor 17.

The motor continues to run at a slower speed until the adjacent tripper 22 contacts the switch 20. This results in release of the relay 44 of the stop control module 42, and the actuation of the dynamic braking module 50 to bring the carriage to a stop at predetermined position. During this period, as explained above, the capacitor 63 will discharge through the resistor 64 to maintain the relay 61 energized during the period of rapidly deceleration, and by the time the carriage has reached a stop, the capacitor 63 has discharged to result in release of the clutch 58.

The turntable (not shown) may now be rotated, the web of cloth rethreaded, and the carriage may be manually moved to align the ends of the web and the previously laid lamina, following which the cycle is repeated to move the carriage to its original position. The manual pressure upon the start button 43 will immediately activate all of the deactivated circuits, including the reengagement of the clutch 58, and the energizing of the motor 17 for rotation in the proper direction.

I wish it to be understood that I do not consider the invention limited to the precise details of structure shown and set forth in this specification, for obvious modifications will occur to those skilled in the art to which the invention pertains.

I claim:

1. Carriage control means for use with a cloth laying machine having a table, a movable carriage supported for rectilinear reciprocation over said table, said carriage having wheeled driving means, and motor means connected to said driving means, said control means comprising: a plurality of switches mounted at predetermined positions along said table located to be operated by tripping means on said carriage, means for supplying current to said motor means, contact by said carriage with one of said switches serving to interrupt passage of current to said motor; electrically operated clutch means interconnecting said motor means and said wheeled driving means, and means for serially deenergizing said motor and said clutch upon contact of said carriage with one of said plurality of switches, said last mentioned means including time delay means for maintaining said clutch means in energized condition for a predetermined period of time after said motor is deenergized.

References Cited

UNITED STATES PATENTS

| | | | |
|---|---|---|---|
| 1,458,896 | 6/1923 | Soylian | 270—31 |
| 2,360,869 | 10/1944 | Gilbert et al. | 270—31 |
| 2,659,597 | 11/1953 | Shaak et al. | 270—31 |

EUGENE R. CAPOZIO, *Primary Examiner.*

P. V. WILLIAMS, *Assistant Examiner.*